United States Patent
Dufaure et al.

(10) Patent No.: US 10,994,858 B2
(45) Date of Patent: May 4, 2021

(54) SYSTEM AND EQUIPMENT FOR PURGING A RESERVOIR AND ASSOCIATED PURGE AND ASSEMBLY PROCESSES

(71) Applicant: DASSAULT AVIATION, Paris (FR)

(72) Inventors: Teddy Dufaure, Merignac (FR); Jean-Philippe Dupont, Merignac (FR); Julien Perrot, Merignac (FR)

(73) Assignee: DASSAULT AVIATION, Paris (FR)

( * ) Notice: Subject to any disclaimer, the term of this patent is extended or adjusted under 35 U.S.C. 154(b) by 36 days.

(21) Appl. No.: 16/513,820

(22) Filed: Jul. 17, 2019

(65) Prior Publication Data
US 2020/0023990 A1    Jan. 23, 2020

(30) Foreign Application Priority Data

Jul. 17, 2018   (FR) ...................................... 1800765

(51) Int. Cl.
*B64D 37/00* (2006.01)
*B64D 37/34* (2006.01)
*F16L 29/02* (2006.01)

(52) U.S. Cl.
CPC ........... *B64D 37/005* (2013.01); *B64D 37/34* (2013.01); *F16L 29/02* (2013.01)

(58) Field of Classification Search
CPC ........ B64D 37/34; B64D 37/005; F16L 29/02
USPC ....................................................... 251/144
See application file for complete search history.

(56) References Cited

U.S. PATENT DOCUMENTS

| | | | | |
|---|---|---|---|---|
| 2,796,882 A | * | 6/1957 | Bradley | ................ F16K 43/006 137/329.4 |
| 2,983,385 A | * | 5/1961 | Botstiber | .................. B03C 1/28 210/222 |
| 3,022,797 A | * | 2/1962 | Allin | ........................ F16K 1/44 137/599.16 |
| 3,026,897 A | * | 3/1962 | Derrington | ............. F16K 35/04 137/315.27 |

(Continued)

FOREIGN PATENT DOCUMENTS

EP          0278755 A1     8/1988
WO     WO2007071932 A1    6/2007

(Continued)

OTHER PUBLICATIONS

Search Report for priority application FR1800765.

*Primary Examiner* — David Colon-Morales
(74) *Attorney, Agent, or Firm* — Davidson, Davidson & Kappel, LLC

(57) ABSTRACT

A system for purging an aircraft fuel reservoir includes a body (48) configured to be assembled on the aircraft fuel reservoir (16) and a valve (50), received in the body (48), and having a released configuration of an outlet channel (70) and a tight closed configuration of the outlet channel (70). The system further comprises a transport pipe (44) secured to the body (48), the transport pipe (44) being configured to be fluidly connected to a fuel supply pipe (20) configured to supply an energy producing device. The transport pipe (44) extends at least between a fuel suction inlet (52) and a discharge outlet (54), the suction inlet (52) being configured to emerge in the aircraft fuel reservoir (16) and the discharge outlet (54) being configured to emerge in the supply pipe (20) when the body (48) is mounted on the aircraft fuel reservoir (16).

17 Claims, 9 Drawing Sheets

(56) References Cited

U.S. PATENT DOCUMENTS

| | | | | |
|---|---|---|---|---|
| 3,610,572 | A * | 10/1971 | Swearingen | F16K 51/00 251/64 |
| 3,698,420 | A * | 10/1972 | Grundy | F16K 31/528 137/329.06 |
| 3,703,189 | A * | 11/1972 | Koller | F16K 31/528 137/329.06 |
| 4,258,738 | A | 3/1981 | Redman et al. | |
| 4,437,487 | A * | 3/1984 | Marmon | F16K 15/18 137/322 |
| 4,809,934 | A * | 3/1989 | Rix | B64D 37/34 244/135 R |
| 4,880,029 | A * | 11/1989 | Koller | F16K 31/528 137/329.06 |
| 8,042,693 | B2 * | 10/2011 | Minty | B64D 37/34 210/416.4 |
| 8,356,616 | B2 * | 1/2013 | Wyatt | F16K 1/443 137/1 |
| 8,840,069 | B2 * | 9/2014 | Minty | B64D 37/34 244/135 R |
| 9,452,846 | B2 * | 9/2016 | Minty | B64D 37/22 |
| 9,809,319 | B2 * | 11/2017 | Burnell | B64D 37/24 |
| 9,957,059 | B2 * | 5/2018 | Kawano | B64D 37/34 |
| 10,024,440 | B2 * | 7/2018 | Richardson | F16K 1/526 |
| 10,610,712 | B2 * | 4/2020 | Jones | A62C 3/08 |
| 10,677,206 | B2 * | 6/2020 | Wheelwright | B01D 61/364 |
| 2020/0023291 | A1 * | 1/2020 | Merat | B01D 17/02 |

FOREIGN PATENT DOCUMENTS

| | | |
|---|---|---|
| WO | WO2008110837 A1 | 9/2008 |
| WO | WO2008110838 A1 | 9/2008 |

* cited by examiner

SYSTEM AND EQUIPMENT FOR PURGING A RESERVOIR AND ASSOCIATED PURGE AND ASSEMBLY PROCESSES

The present application includes the same specification and drawings as U.S. Pub. 2020/0023291 A1, filed on the same date as the present application.

The present invention relates to a system for purging water contained in an aircraft fuel reservoir comprising:

a body configured to be mounted on the reservoir, at least partially through a through opening of a wall of the reservoir, the body defining an outlet channel; and a valve, received in the body, and having a released configuration of the outlet channel, in which the outlet channel is configured to be in fluid communication with the inside of the reservoir when the body is mounted on the reservoir, and a tight closing configuration of the outlet channel, in which the outlet channel is configured to be fluidly isolated from the inside of the reservoir when the body is mounted on the reservoir.

A fuel tank has an environment favorable to the development of microbial pollution. Over time, water condenses in the fuel and is collected at the bottom of the tank. At the interface between the water and the fuel, microorganisms such as bacteria can develop. When these microorganisms proliferate, they constitute pollution that is at the origin of its corrosion.

BACKGROUND

In order to avoid this proliferation, a first known method is to purge the water accumulated in the bottom of the reservoir by pumping it and diluting it with the fuel to supply propulsion engines of the aircraft.

Furthermore, a second known method is to monitor the presence of water in the reservoir, by means of a manual purging system.

This purging system typically comprises a body mounted in an opening at the bottom of the reservoir, and a manual valve for closing and opening the body. The valve slides in the body between a low closed position closing off the body and a high open position in which liquid contained in the reservoir can be discharged. An operator can thus actuate the purge by pushing the valve upward to move it into its high open position.

However, such a purging system lacks compactness.

Furthermore, the operations performed with this purging system are also tedious. Indeed, an aircraft comprises several reservoirs, and the purges are arranged in hard-to-reach areas of the aircraft, for example at a landing gear. For each reservoir, it is necessary to check daily by sampling whether it contains water.

Lastly, the known equipment for producing the manual purges is conventional and may lead to substantial fuel leaks. The leaks are sources of pollution and cause a risk of fines at some airports. Furthermore, they prevent the flight of the aircraft and must therefore be repaired before any flight.

Furthermore, the known purge system described above also typically comprises a system for locking the valve in the high open position in particular allowing complete emptying of the reservoir of the aircraft during maintenance operations. The locking system is typically formed by an L-shaped slot delimited in the body, which has a vertical part and a horizontal part. A guide lug secured to the moving valve slides with the valve in the vertical part until the valve is in the high position. From this position, it suffices to rotate the valve around its axis for the guide lug to slide in the horizontal part of the L of the slot. The guide lug then prevents the valve from returning to its low position. To rotate the valve around its axis, the latter is provided with a rectilinear cavity in which the operator inserts a metal tool of the "slot screwdriver" type.

One problem encountered with this system is the untimely locking of the valve in the high position. Indeed, by malfunction of the locking system or lack of understanding thereof, the valve may unintentionally remain open. The fuel then spreads to the outside of the reservoir in an uncontrolled manner until manual locking of the body by the operator. As a result, the aircraft is immobilized on the ground for a long period of time.

For these reasons, the operators are hesitant to perform inspections and the necessary purges of the fuel reservoirs. The inspections and purges are then not done as often as necessary, promoting the appearance of microbial pollution and corrosion.

SUMMARY OF THE INVENTION

The present disclosure aims to provide equipment making it possible to purge the water contained in an aircraft fuel reservoir that is compact, easy to use and effective.

To that end, a purging system of the aforementioned type is provided, characterized in that it further comprises a transport pipe secured to said body, the transport pipe being configured to be fluidly connected to a fuel supply pipe configured to supply an energy producing device with fuel contained in the reservoir, the transport pipe extending at least between a fuel suction inlet and a discharge outlet, the suction inlet being configured to emerge in the reservoir and the discharge outlet being configured to emerge in the supply pipe when the body is mounted on the reservoir.

The purging system may further comprise one or more of the features below, considered alone or according to any technical possible combination:

the valve is movable relative to the body and the body defines a valve seat, the valve being in contact with the valve seat in its tight closing configuration, and being separated from the valve seat in its released configuration;

said system according to the aforementioned type comprises a device for returning the valve to its tight closed configuration, the return device preferably comprising a spring having an end fastened to the body and an end fastened to the valve;

the transport pipe comprises a Venturi, between the suction inlet and the discharge outlet;

said system according to the aforementioned type further comprises a sampling pipe mounted at least partially in the body and extending between a sampling inlet and a sampling outlet, the sampling inlet being configured to emerge at least partially opposite an edge of said through opening when the body is mounted on the reservoir, the sampling outlet emerging in the transport pipe, upstream or in the Venturi;

the sampling pipe is formed by the valve, the sampling pipe being partially received in the body, or the sampling pipe is formed by a separate part from the valve.

A set for purging an aircraft fuel reservoir is also provided comprising a purging system according to the aforementioned type; and a tool for locking and unlocking the valve in the released configuration, the tool comprising:

a discharge pipe configured to be fastened removably on the body of the purging system, the inside of the discharge pipe and the outlet channel being in fluid communication when the discharge pipe is fastened on the body; and a rod, secured to the discharge pipe and protruding relative to the discharge pipe, an outer end of the rod being configured to come into contact with the valve and to keep the valve in its released configuration when the discharge pipe is fastened on the body.

The set may further comprise one or more of the features below, considered alone or according to any technical possible combination:

the valve has an outer face, received in the outlet channel when the valve is in its tight closing configuration, the outer face having a spherical cavity, said outer end of the rod having a shape complementary to said spherical cavity;

the discharge pipe and the outlet channel each comprise a thread, the threads being configured to cooperate to ensure the removable fastening of the discharge pipe on the body.

An energy producing assembly is also provided comprising:

an energy producing device of the aircraft;

at least one fuel reservoir containing fuel and water and comprising a wall defining a through opening and a fuel supply pipe configured to supply said energy producing device with the fuel contained in the reservoir;

a purging system according to the aforementioned type, the body being mounted on the reservoir at least partially through the through opening, the transport pipe being fluidly connected to the supply pipe, the suction inlet emerging in the reservoir and the discharge outlet emerging in the supply pipe.

The assembly may further comprise one or more of the features below, considered alone or according to any technical possible combination:

the body has at least one lateral orifice, said lateral orifice being arranged inside the reservoir and at least partially opposite an edge of said through opening, the outlet channel being in fluid communication with the inside of the reservoir by means of the lateral orifice in the released configuration of the valve, the supply pipe has a guide cone of the purging system, receiving the transport pipe, the supply pipe has an open end, the transport pipe being received in this open end, and at least one region of the sampling pipe comprising the sampling outlet is coaxial with the transport pipe.

An aircraft comprising an energy producing assembly as described above is also provided.

A method for purging water contained in an aircraft fuel reservoir is also provided comprising the following steps:

providing the assembly according to the aforementioned type;

purging water contained in the reservoir by gravitational flow, this purging step by gravitational flow comprising the following sub-steps:

passage of the valve from its tight closing configuration to its released configuration; and flow of at least part of the water contained in the reservoir toward the outlet channel.

The purging method may further comprise one or more of the features below, considered alone or according to any technical possible combination:

the transport pipe comprises a Venturi, between the suction inlet and the discharge outlet, the purging system further comprising a sampling pipe mounted at least partially in the body and extending between a sampling inlet and a sampling outlet, the sampling inlet emerging at least partially opposite an edge of said through opening, the sampling outlet emerging in the transport pipe, upstream or in the Venturi;

the method further comprising a step for purging water contained in the reservoir by suction, this purging step by suction comprising the following sub-steps:

suctioning fuel through the suction inlet of the transport pipe and flow of the suction fuel toward the energy producing device by means of the supply pipe; and joint suction of water through the sampling inlet of the sampling pipe and flow of the suctioned water toward the energy producing device by means of the supply pipe;

the step for purging by gravitational flow comprises providing a tool for locking and unlocking the valve in the released configuration, the tool comprising:

a discharge pipe configured to be fastened removably on the body of the purging system, the inside of the discharge pipe and the outlet channel being in fluid communication when the discharge pipe is fastened on the body; and a rod, secured to the discharge pipe and protruding relative to the discharge pipe, an outer end of the rod being configured to come into contact with the valve and to keep the valve in its released configuration when the discharge pipe is fastened on the body;

the sub-step for passage of the valve from its tight closing configuration to its released configuration comprising:

placing the outer end of the rod in contact with the valve;

moving the tool so as to take the valve from its closing configuration to its released configuration;

fastening the discharge pipe on the body of the purging system; and the flow of the water contained in the reservoir in the outlet channel and the discharge pipe.

A method for assembling a purging system on an aircraft fuel reservoir is also provided comprising the following steps:

providing a reservoir comprising a wall defining a through opening and a fuel supply pipe configured to supply an aircraft energy producing device;

providing a purging system of the aforementioned type, said purging system initially being arranged away from the reservoir;

inserting the transport pipe in the through opening, advantageously from the outside of the reservoir, and connecting the transport pipe to the supply pipe, the discharge outlet emerging in the supply pipe and the suction inlet emerging in the reservoir; and assembling the body of the reservoir at least partially through the through opening.

In one preferred embodiment of the assembly method, the supply pipe has an open end emerging in the reservoir, the supply pipe having a cone at its open end, the connecting step comprising guiding the transport pipe, by the cone of the supply pipe.

BRIEF SUMMARY OF THE DRAWINGS

The invention will be better understood upon reading the following description, provided solely as an example and done in reference to the appended drawings, in which.

DETAILED DESCRIPTION

Figure 1:
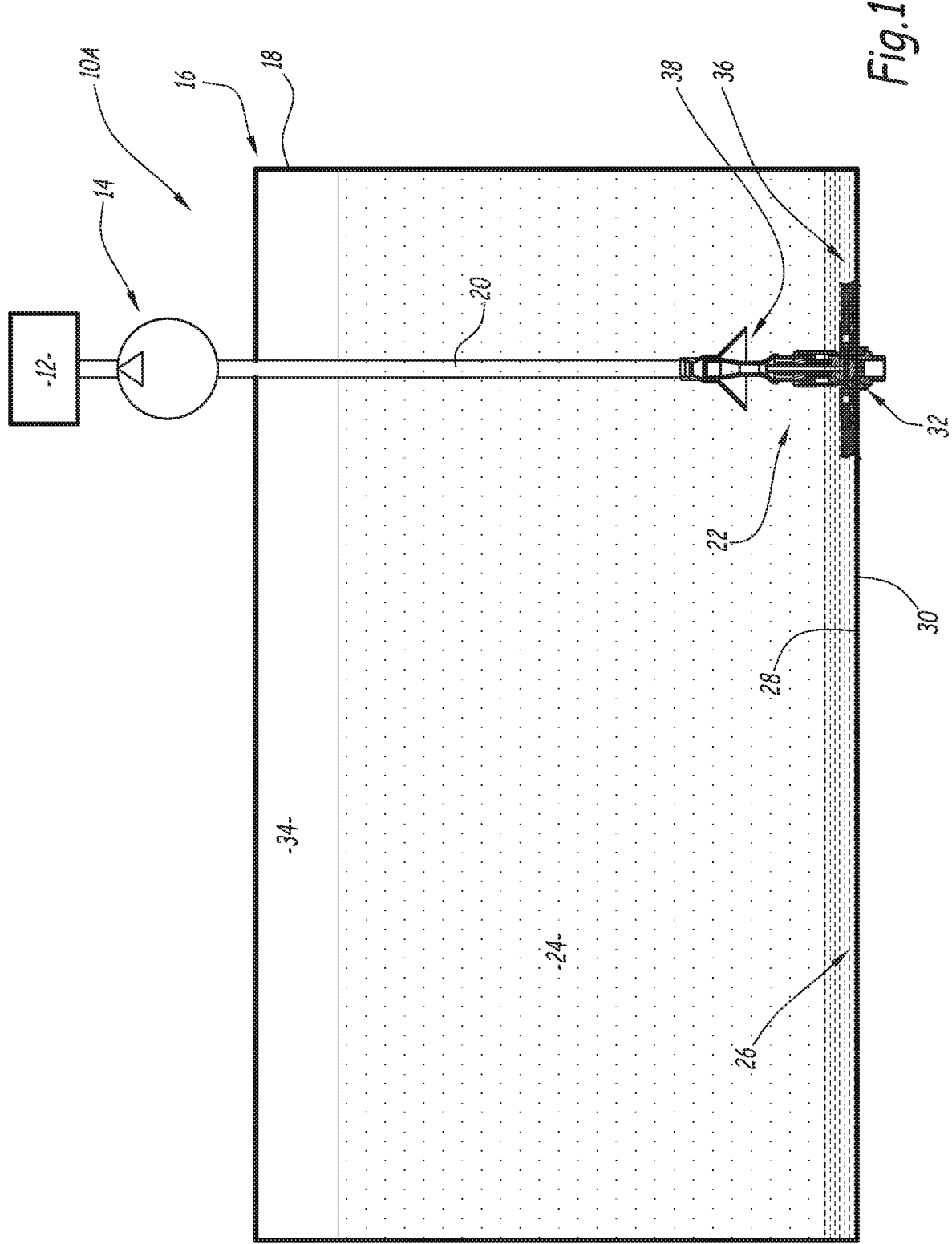
FIG. 1 is a schematic view of a first aircraft energy producing assembly according to an embodiment of the invention.

An aircraft comprising a first aircraft energy producing assembly 10A illustrated in FIG. 1.

The first energy producing assembly 10A comprises an energy producing device 12 of the aircraft, a pump 14 and at least one fuel reservoir 16, the reservoir 16 comprising a wall 18 and a fuel supply pipe 20.

The first assembly 10A also comprises a purging system 22 for the water contained in the reservoir 16.

The energy producing device 12 is configured to produce energy from the fuel contained in the reservoir 16.

In the first assembly 10A, the energy producing device 12 is for example one of the engines of the aircraft or an auxiliary power unit (APU) of the aircraft.

The pump 14 is connected to the supply pipe 20 and is configured to circulate a fluid inside the supply pipe 20.

To that end, the pump 14 is sized so as to supply the flow rate requested by the energy producing device 12 over its entire operating regime range.

By means of the pump 14, the energy producing device 12 is thus configured to impose a minimum operating flow rate and a maximum operating flow rate in the supply pipe 20.

In the case where the energy producing device 12 is an aircraft engine, it is configured to impose a nominal fuel flow rate supplying the engine greater than 3 L/min.

As illustrated in FIG. 1, the reservoir 16 contains fuel 24 and water 26. The water 26 typically comes from a condensation phenomenon and is collected by gravity at the bottom of the reservoir 16.

Microorganisms, such as bacteria, can develop in the reservoir 16, more specifically at the interface between the water 26 and the fuel 24. These microorganisms can proliferate and constitute microbial pollution of the reservoir 16.

The wall 18 of the reservoir 16 has an inner surface 28 and an outer surface 30, the inner surface 28 delimiting an inner volume 34 of the reservoir 16.

The wall 18 defines a through opening 32 arranged in a region 36 of the reservoir 16 in which the water 26 accumulates by gravity after its condensation.

The supply pipe 20 is configured to supply said energy producing device 12 with the fuel 24 contained in the reservoir 16.

To that end, the supply pipe 20 is fluidly connected to the energy producing device 12 and to the pump 14.

The supply pipe 20 is also at least partially arranged inside the inner volume 34 of the reservoir 16, and passes through the wall 18. It passes through it via an opening separate from the through opening 32.

The supply pipe 20 has an open end 38 emerging in the reservoir 16.

Figure 2:
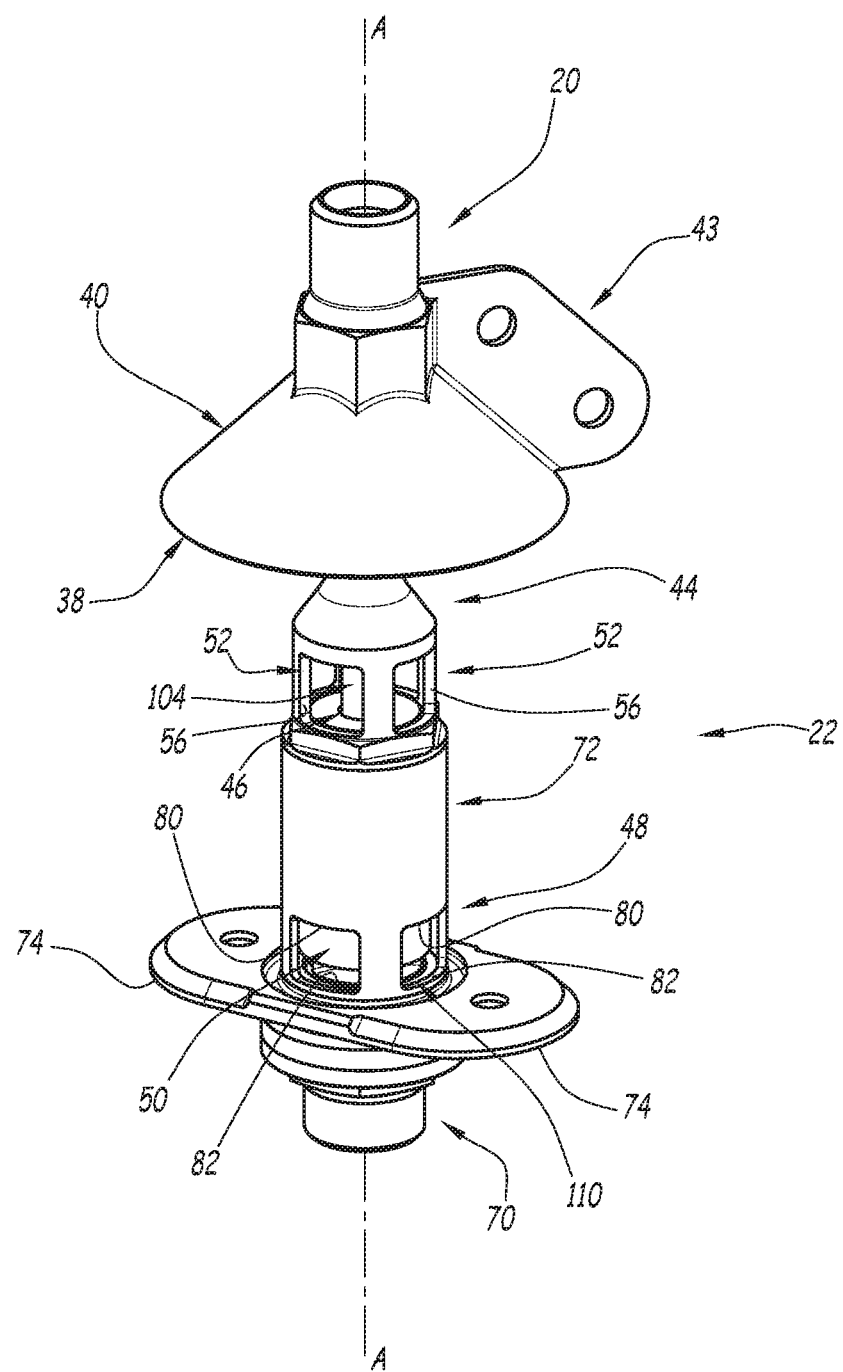
FIG. 2 is a schematic perspective view of a purging system of the assembly of FIG. 1.
Figure 3:
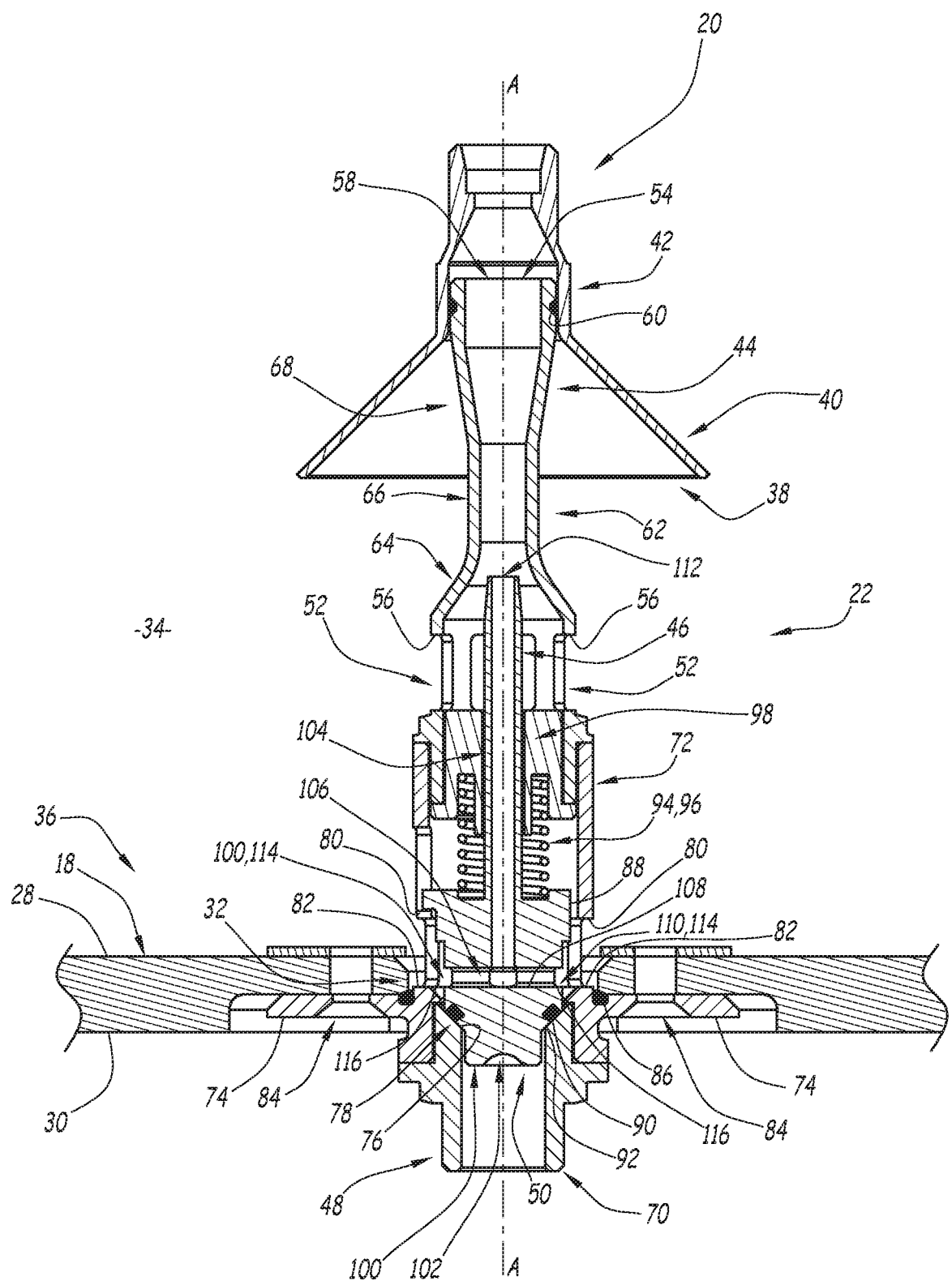
FIG. 3 is a schematic sectional view of the purging system of FIG. 2.

As illustrated in FIGS. 2 and 3, the supply pipe 20 widens toward the open end 38 to form a cone 40.

Downstream from the cone 40, the supply pipe 20 has a region 42 accommodating the purging system 22 as described in more detail hereinafter. Here and hereinafter, the terms "upstream" and "downstream" will be understood with respect to the normal flow direction of the fuel when the pump 14 is turned on to supply the energy producing device 12.

The accommodating region 42 has a substantially constant inner section, the cone 40 extending from the accommodating region 42 toward the open end 38.

The supply pipe 20 also comprises a fastening support 43 to the wall 18.

In the example illustrated in FIG. 2, the fastening support 43 is a plate having through holes and extending from an outer surface of the cone 40. The plate is fastened to the wall 18.

The purging system 22 of the first assembly 10A is illustrated in more detail in FIGS. 2 and 3.

The purging system 22 comprises a transport pipe 44 fluidly connected to the supply pipe 20, and configured to suction the fuel 24 contained in the reservoir 16 and to cause it to flow toward the supply pipe 20 in order to supply the energy producing device 12.

The purging system 22 also advantageously comprises a sampling pipe 46, configured to suction the water 26 accumulating at the bottom of the reservoir 16 and to cause it to flow toward the transport pipe 44, to supply the energy producing device 12 with fuel having a controlled water concentration.

Furthermore, in the first assembly 10A, the purging system 22 comprises a body 48 mounted on the reservoir 16 and a valve 50 received in the body 48.

The transport pipe 44 extends between at least a fuel suction inlet 52 and a fuel discharge outlet 54.

In the example of FIG. 3, the transport pipe 44 extends along a longitudinal axis A and is centered on this longitudinal axis A.

In the example illustrated in FIG. 3, the transport pipe 44 has a plurality of suction inlets 52.

In the first assembly 10A, each suction inlet 52 is defined by a lateral opening 56 arranged in the transport pipe 44.

The transport pipe 44 extends toward the body 48 along the longitudinal axis A, including past each suction inlet 52. In other words, the transport pipe 44 does not stop longitudinally at the suction inlets 52. The transport pipe 44 extends longitudinally up to a free end where it stops longitudinally, this free end being located at a distance and upstream from the suction inlets 52.

All of said suction inlets 52 are arranged at the same level along the longitudinal axis A. In particular, they are superimposed on one another projected over the longitudinal axis A.

Each suction inlet 52 is arranged above an estimated maximum water level 26 configured to be accumulated in the reservoir 16 during a predetermined time period. Thus, only the fuel is suctioned through the suction inlets 52. Here and hereinafter, the terms "upper", "lower", "above" and "below" will be understood in reference to the longitudinal axis A.

Each suction inlet 52 is arranged outside the body 48, in the sense where projected along the longitudinal axis A, no suction inlet 52 is superimposed on the body 48.

In particular, projected over the longitudinal axis A, each suction inlet 52 is arranged between the body 48 and the discharge outlet 54 of the transport pipe 44.

The transport pipe 44 is received in the open end 38 of the supply pipe 20.

In particular, the transport pipe 44 is received in the accommodating region 42 of the supply pipe 20, the accommodating region 42 tightly gripping the transport pipe 44.

The cone 40 of the supply pipe 20 thus forms a guide cone of the transport pipe 44, the guide cone 40 surrounding the transport pipe 44.

At least one region of the transport pipe 44 comprising the discharge outlet 54 is coaxial with a region of the supply pipe 20 comprising the open end 38 and the accommodating region 42 of the supply pipe 20.

The discharge outlet 54 emerges in the supply pipe 20.

The discharge outlet 54 is formed by an open upper end 58 of the transport pipe 44. This upper end 58 is arranged in the accommodating region 42.

An O-ring 60, secured to the transport pipe 44, comes into contact with the supply pipe 20, at the accommodating region 42, to ensure the tightness between the transport 44 and supply 20 pipes. In a variant, this O-ring 60 is secured to the supply pipe 20.

The transport pipe 44 has a Venturi 62 downstream from the fuel suction inlets 52.

More specifically, the Venturi 62 is arranged between the discharge outlet 54 on the one hand and the suction inlets 52 on the other hand. The Venturi 62 is thus arranged downstream from the free end of the transport pipe 44.

The Venturi 62 is formed in the transport pipe 44 by a region of decreasing inner section 64 toward the discharge outlet 54, a region of constant inner section 66 extending from the region of decreasing inner section 64, and a region of increasing inner section 68 toward the discharge outlet 54 extending from the region of constant inner section 66.

As illustrated in FIG. 3, the pump 14 is downstream from the Venturi.

The presence of a pump 14 arranged downstream from the Venturi, and the coaxial nature of the region of the transport pipe 44 comprising the discharge outlet 54 with a region of the supply pipe 20 comprising the open end 38 and the accommodating region 42 of the supply pipe 20, together ensure maximal compactness in the reservoir 16, while limiting the radial bulk.

As illustrated in FIG. 3, the body 48 is assembled on the reservoir 16 at least partially through the through opening 32.

The body 48 extends along the longitudinal axis A.

It comprises an outlet channel 70, a central guide channel 72 and lateral fins 74.

The outlet channel 70 is hollow and emerges outside the reservoir 16. It is thus arranged at least partially outside the reservoir 16.

In the example of FIG. 3, the outlet channel 70 is formed by a separate part from the central channel 72 and the fins 74, and is fastened to the rest of the body 48.

The outlet channel 70 is preferably cylindrical, for example with a circular section. It extends along the longitudinal axis A and is centered on this axis A.

The outlet channel 70 is in particular coaxial with the transport pipe 44.

In the example of FIG. 3, the outlet channel 70 defines a valve seat 76 configured to cooperate with the valve 50.

The valve seat 76 more specifically corresponds to a surface of the outlet channel 70 arranged at an upper end 78 of the outlet channel 70.

The valve seat 76 in this example is frustoconical.

The central guide channel 72 is arranged partially inside the reservoir 16 and partially outside the reservoir 16.

The central channel 72 is preferably cylindrical, for example with a circular section. It extends along the longitudinal axis A and is centered on this axis A.

The central channel 72 is in particular coaxial with the transport pipe 44 and the outlet channel 70. It extends in the extension of the outlet channel 70.

The central channel 72 is fastened to the transport pipe 44.

In the example illustrated in FIG. 3, the central channel 72 defines a shoulder in contact with part of the upper end 78 of the outlet channel 70.

In a ground maneuver typical of the aircraft, the outlet channel 70 is arranged below the central channel 72, relative to a vertical axis typical of the aircraft.

The central channel 72 has at least one lateral through orifice 80. Preferably, the central channel 72 has a plurality of lateral orifices 80.

Each lateral orifice 80 is arranged inside the reservoir 16 and preferably at least partially opposite an edge of said through opening 32.

In the example of FIG. 3, a lower edge 82 of each lateral orifice 80 is arranged, along the longitudinal axis A, below the inner surface 28 of the wall 18 of the reservoir 16 at the through opening 32.

The fins 74 extend from the central channel 72 perpendicular to the longitudinal axis A. They are arranged outside the reservoir 16.

The fins 74 here are integral with the central channel 72.

The fins 74 are attached against the outer surface 30 of the wall 18 of the reservoir 16. They are fastened to the wall 18 of the reservoir 16 by a tight fastening device 84.

Furthermore, the body 48 comprises an O-ring 86 arranged between the fins 74 and the outer surface 30 of the wall 18. This O-ring 86 surrounds the through opening 32 and makes it possible to ensure the tightness between the body 48 fastened to the wall 18 and the wall 18.

The valve 50 comprises at least a base 88 and a sealing gasket 90.

Said base 88 has an outer surface 92 complementary to the seat of the valve 76.

The sealing gasket 90 is arranged on said complementary outer surface 92 of the base 88. The sealing gasket 90 is for example secured to the base 88.

The valve 50 has a released configuration of the outlet channel 70 and a tight closing configuration of the outlet channel 70, illustrated in FIG. 3.

In the illustrated embodiment, the valve 50 is movable relative to the body 48.

It is arranged partially in the central channel 72 and is configured to slide in the central channel 72. The valve 50 is also arranged partially in the outlet channel 70 and is configured to slide in the outlet channel 70.

In the released configuration of the valve 50, the outlet channel 70 is in fluid communication with the inside of the reservoir 16, in particular by means of lateral orifices 80 of the central channel 72 of the body 48.

In the released configuration, the valve 50 is arranged separated from the valve seat 76. In particular, said complementary outer surface 92 of the base 88 and the sealing gasket 90 are separated from the valve seat 76.

In the closing configuration, the outlet channel 70 is configured to be fluidly isolated from the inside of the reservoir 16, in particular fluidly isolated from the lateral orifices 80.

In the closing configuration, the valve 50 obstructs the outlet channel 70. The valve 50 is in contact with the valve seat 76. In particular, said complementary outer surface 92 of the base 88 is pressed on the valve seat 76. Furthermore, the sealing gasket 90 is in contact with the valve seat 76 to ensure the tightness of the closing.

As illustrated in FIG. 3, a return device 94, comprised in the purging system 22, is configured to return the valve 50 to its tight closing configuration.

The return device 94 preferably comprises a spring 96 having an upper end fastened to the body 48 and a lower end fastened to the valve 50.

The lower end of the spring 96 is in particular fastened to said base 88.

In the exemplary embodiment of FIG. 3, the spring 96 is fastened to the body 48 by means of a support part 98 fastened to the central channel 72, the support part 98 being received at least partially in the central channel 72.

Furthermore, as illustrated in FIG. 3, the base 88 also has an outer face 100, received in the outlet channel 70 when the valve 50 is in its tight closing configuration.

The outer face 100 is substantially planar, extends perpendicular to the longitudinal axis A and is oriented toward the outside of the reservoir 16.

The outer face 100 has a hollow spherical cavity 102.

In the example of the first assembly 10A illustrated in FIG. 3, the sampling pipe 46 is formed by the valve 50, the sampling pipe 46 thus being at least partially assembled in the body 48. To that end, the valve 50 further comprises a nozzle 104 extending from said base 88 toward the transport pipe 44.

More specifically, the nozzle 104 and said base 88 form the sampling pipe 46, the nozzle 104 being hollow and said base 88 defining an inner chamber 106 emerging on the inside of the nozzle 104.

The nozzle 104 here extends along the longitudinal axis A.

In this example, it is integral with said base 88.

The nozzle 104 has an outer section smaller than the inner section of the region of constant inner section 66 of the Venturi 62.

The nozzle 104 passes through the spring 96 and the support part 98 of the spring 96, the spring 96 being arranged around the nozzle 104.

The inner chamber 106 of the base 88 has a bottom 108 extending perpendicularly relative to the longitudinal axis A.

The sampling pipe 46 extends between a sampling inlet 110, defined here in the base 88, and a sampling outlet 112, defined here by the nozzle 104.

At least one region of the sampling pipe 46 comprising the sampling outlet 112 is coaxial with the transport pipe 44. The bulk is therefore limited.

The sampling pipe 46 is received in the transport pipe 44 while passing through the free end of the transport pipe 44.

The sampling outlet 112 emerges in the transport pipe 44, upstream from or in the Venturi 62. The sampling outlet 112 is thus for example arranged in the region of decreasing inner section 64 or in the region of constant inner section 66.

The sampling outlet 112 here is formed by an open upper end of the nozzle 104.

Projected over the longitudinal axis A, the sampling outlet 112 is arranged between the discharge outlet 54 of the transport pipe 44 and each suction inlet 52.

In the example illustrated in FIG. 3, the sampling pipe 46 has a plurality of sampling inlets 110.

Each sampling inlet 110 is defined by a lateral opening 114 in the base 88 of the valve 50, the lateral opening 114 emerging in the inner chamber 106 of the base 88.

The sampling inlets 110 each have a lower edge 116. As illustrated in FIG. 3, each lower edge 116 and the bottom 108 of the inner chamber 106 are located substantially in a same horizontal plane.

In the closing configuration of the valve 50, each sampling inlet 110 is at least partially opposite a lateral orifice 80 of the central channel 72.

Furthermore, in the closing configuration of the valve 50, each sampling inlet 110 emerges at least partially opposite an edge of said through opening 32.

More specifically, in the closing configuration, the lower edge 82 of each lateral orifice 80 of the central channel 72, the lower edge 112 of each sampling inlet 110 and the bottom 108 of the inner chamber 106 are located substantially in the same plane.

Furthermore, as illustrated in FIG. 3, in the closing configuration, the bottom 108 of the inner chamber 106 of the base 88 is arranged, along the longitudinal axis A, below the inner surface 28 of the wall 18 of the reservoir 16, near the through opening 32. The water accumulating in the bottom of the reservoir 16 is thus configured to fill the inner chamber 106 by gravity.

The sampling pipe 46 is separate from the transport pipe 44 and has no contact with the transport pipe 44.

In the first assembly 10A, the purging system 22 is configured to produce a purge by gravitational flow of the water 26 contained in the reservoir 16.

To produce this purge by gravitational flow of the reservoir 16, a set for purging is advantageously provided. The set comprises the purging system 22 described above, and a tool 152 for locking and unlocking the valve 50 in the released configuration.

Figure 4:
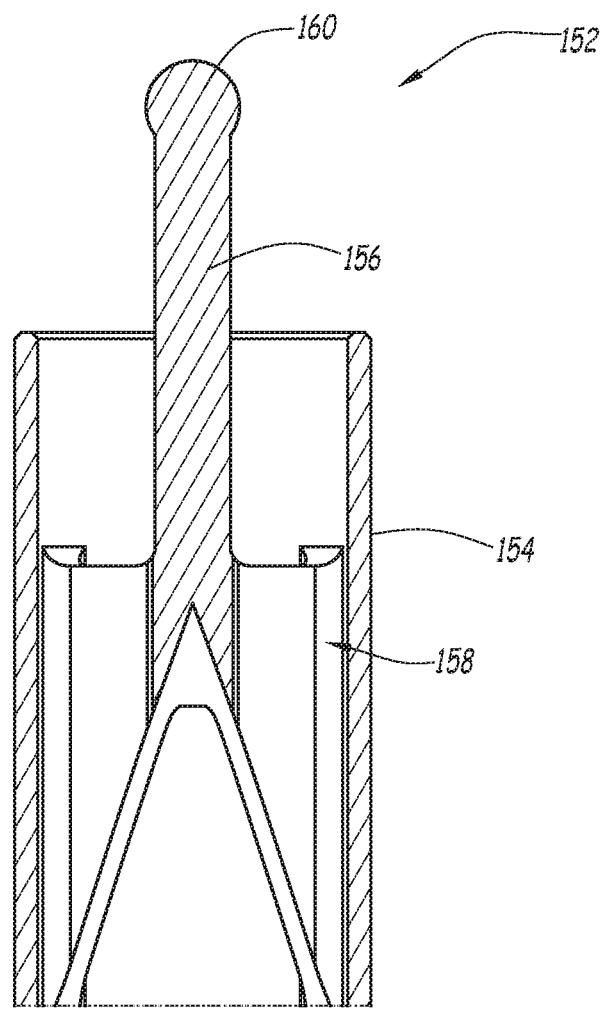
FIG. 4 is a schematic sectional view of a tool for locking and unlocking the valve of the purging system of FIG. 2 in the released configuration.

This tool 152 is illustrated in more detail in FIG. 4.

The tool 152 comprises a discharge pipe 154 and a push rod 156.

The discharge pipe 154 is configured to be fastened removably on the body 48 of the purging system 22.

When the discharge pipe 154 is fastened on the body 48, the inside of the discharge pipe 154 and the outlet channel 70 are in fluid communication.

In the example illustrated in FIGS. 3 and 4, the discharge pipe 154 and the outlet channel 70 each comprise a thread 154a, 70a, respectively (FIG. 5), the threads 154a, 70a being configured to cooperate to ensure the removable fastening of the discharge pipe 154 on the body 48.

The rod 156 is secured to the discharge pipe 154, by means of a support structure 158 configured to allow a liquid to pass.

The rod 156 protrudes relative to the discharge pipe 154, and has an outer end 160 configured to come into contact with the valve 50, to push it and keep it in its released configuration when the discharge pipe 154 is fastened on the body 48.

The rod 156 is received in the outlet channel 70 when the discharge channel 154 is fastened on the body 48.

Preferably, the outer end 160 of the rod 156 has a shape complementary to the spherical cavity 102 of the outer face 100 of the valve 50.

The outer end 160 thus has a half-sphere shape.

The rod 156 is preferably made from plastic.

The assembly of the purging system 22 on the aircraft fuel reservoir 16 will now be described.

This assembly comprises providing the aircraft fuel reservoir 16 and providing the purging system 22.

The purging system 22 is initially arranged away from the reservoir 16, and the reservoir 16 is initially empty of fuel.

The transport pipe 44 is inserted by an operator into the through opening 32, then connected to the supply pipe 20 of the reservoir 16.

The connection comprises guiding the transport pipe 44, via the cone 40 of the supply pipe 20.

This guiding by the cone 40 facilitates the connection. Indeed, the operator cannot see the inside of the reservoir 16, and the connection is therefore done blindly by the operator from the outside of the reservoir 16.

At the end of this connection, the discharge outlet 54 emerges in the supply pipe 20 and each suction inlet 52 emerges in the reservoir 16.

In parallel with the insertion of the transport pipe 44, the body 48 of the purging system 22 is assembled on the reservoir 16 at least partially through the through opening 32.

The body 48 is then fastened on the reservoir 16. During this fastening, the fins 74 are attached against the wall 18 of the reservoir 16 and fastened to the wall 18 of the reservoir 16 by the tight fastening device 84.

Thus, the purging system 22 does not require any adaptation of the current reservoirs to allow its assembly, and can easily replace the existing purging systems.

Subsequently, once the purging system 22 is assembled on the fuel reservoir 16, the reservoir 16 is filled with fuel and the first energy producing assembly 10A is obtained.

If necessary, the purging system 22 can be disassembled from the outside, for example for an inspection or cleaning.

A method for purging the water 26 contained in the fuel reservoir 16 can then be carried out.

During operation, in particular when the aircraft is stopped on the ground, the purging method comprises purging by gravitational flow of the water 26 contained in the reservoir 16.

Advantageously, the purging by gravitational flow is carried out with the tool 152 for locking and unlocking the purging set described above.

Preferably, the purging by gravitational flow is preceded by performing a preliminary sampling intended to observe the presence or absence of water in the reservoir 16. This sampling is illustrated in FIG. 5.

To perform this preliminary sampling, an operator takes the valve 50 from its tight closing configuration to its released configuration, the valve 50 initially being in its closing configuration.

To that end, the operator places the outer end 160 of the rod 156 in contact with the valve 50. The outer end 160 is received in the spherical cavity 102 of the outer face 100 of the valve 50.

Figure 5:
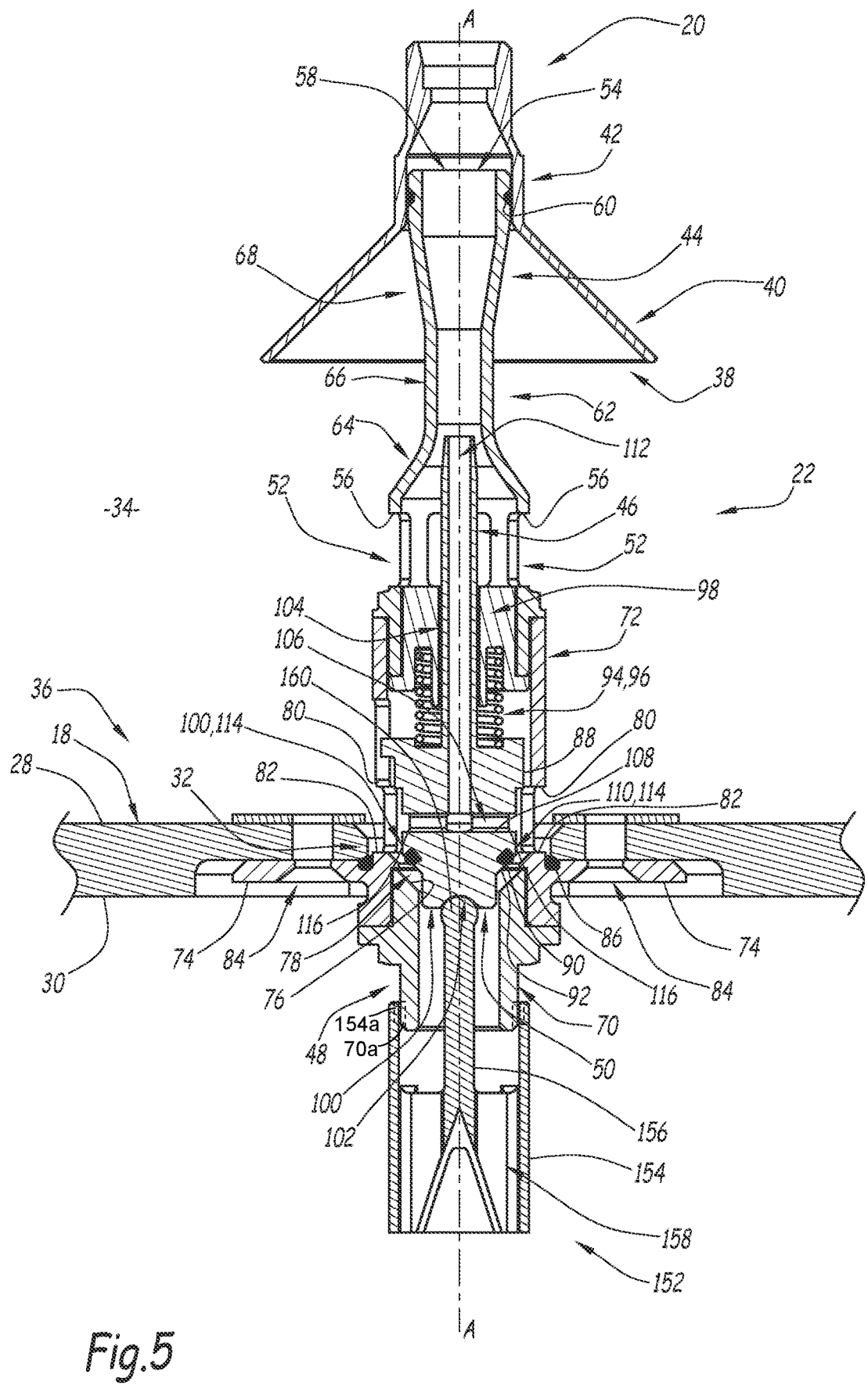
FIGS. 5 and 6 are schematic sectional views of the purging system of FIG. 2 during a method for purging water contained in the reservoir.

As illustrated in FIG. 5, the operator moves the tool 152 so as to take the valve 50 from its closing configuration to its released configuration.

In particular, the tool 152 is moved longitudinally toward the valve 50 in the direction of the longitudinal axis A.

The liquid contained in the reservoir 16 passes through each lateral orifice 80 of the central channel 72 of the body 48, and flows toward the outlet channel 70 and to the outside of the reservoir 16.

The operator recovers, with an appropriate container, the liquid that flows outside the reservoir 16 through the outlet channel 70.

Once a sufficient quantity of liquid to form a sample has flowed, the operator returns the valve 50 from its released configuration to its closing configuration.

The tool 152 is moved to that end opposite the valve 50. The return device 94 spontaneously returns the valve 50 into its tight closing configuration.

The operator examines the sample and whether the liquid that has flowed contains water; the operation is repeated in the same way until the sample only contains fuel.

Figure 6:
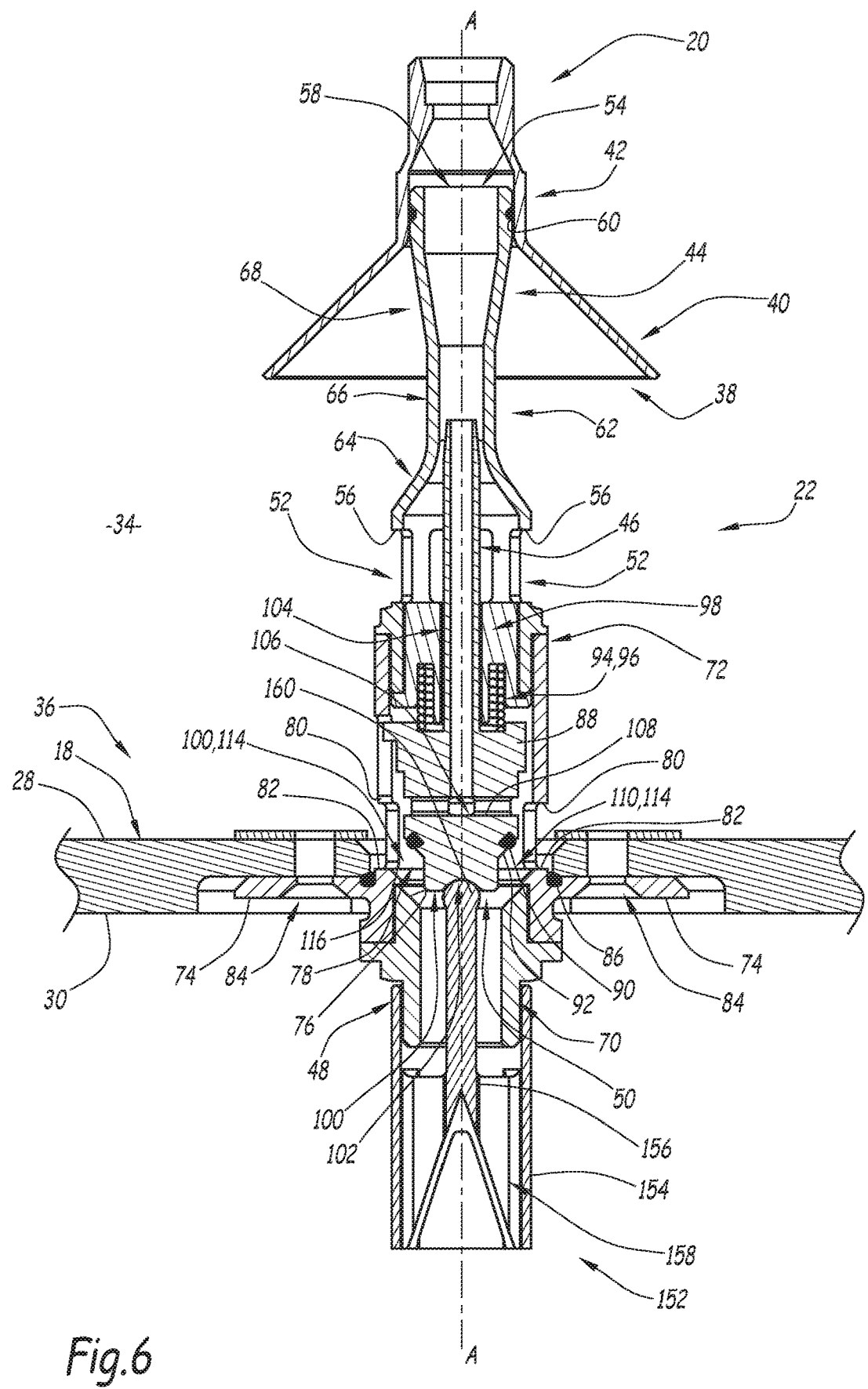

To that end, as illustrated in FIG. 6, the operator moves the tool 50 again from its closing configuration to its released configuration in a similar manner.

The discharge pipe 154 is next fastened on the body 48 of the purging system 22.

To that end, it is screwed on the thread of the outlet channel 70. The valve 50 is thus locked in its released configuration. In other words, as long as the discharge pipe 154 is fastened on the body 48, the valve 50 is kept in the released configuration.

The tool 152 is thus configured to be manipulated simply by the operator, and greatly reduces the risks of untimely locking of the valve in the released configuration.

Owing to the spherical shape of the cavity of the valve 50 and the outer end 160 of the rod 156, the cavity 102 is not damaged by the contact with the outer end 160 of the rod 156, in particular during the screwing of the discharge pipe 154 on the outlet channel 70. In the case where the rod 156 is made from plastic, the cavity 102 is damaged even less.

When the discharge pipe 154 is fastened on the body 48, the valve 50 is for example further away from the valve seat 76 than during the preliminary sampling.

The inside of the discharge pipe 154 and the outlet channel 70 are thus in fluid communication and the water 26 contained in the reservoir 16 then flows in the outlet channel 70, then in the discharge pipe 154.

This water is also recovered with an appropriate container.

When the operator sees that there is only fuel 24 flowing outside the reservoir 16 through the outlet channel 70, the operator returns the valve 50 from its released configuration to its closing configuration.

To that end, he unscrews the discharge pipe 154 and moves the tool 152 opposite the valve 50 until the return device 94 returns the valve 50 to its tight closing configuration.

The purging by gravitational flow thus constitutes a first way of discharging the water 26 contained in the reservoir 16 by using the purging system 22 of the first assembly 10A.

Furthermore, during operation, the purging method comprises a step for purging by suction of the water 26 contained in the reservoir 16 that constitutes a second manner of discharging the water 26 contained in the reservoir 16.

This purging by suction is implemented when the energy producing device 12 is started. It is therefore in particular implemented when the aircraft is on the ground, the energy producing device 12 being activated, when it performs a maneuver on the ground or a takeoff or landing maneuver or when it is in flight. This purging by suction is also implemented when the aircraft is stopped, once the energy producing device 12 is started.

During the purging by suction, the valve 50 is preferably in the closing configuration.

The purging by suction comprises suctioning of the fuel 24 through the suction inlet 52 of the transport pipe 44. The suctioned fuel 24 flows from each suction inlet 52 toward the discharge outlet 54, then toward the energy producing device 12 via the supply pipe 20.

During the purging by suction, the water 26 is suctioned through each sampling inlet 110 of the sampling pipe 46.

More specifically, when the fuel 24 is suctioned in the transport pipe 44, the Venturi 62 creates a vacuum by Venturi effect, this vacuum depending on the flow rate in the supply pipe 20. Given that the sampling pipe 46 emerges upstream from or in the Venturi 62, when the flow rate in the supply pipe 20 is sufficient, the vacuum created by the Venturi 62 is sufficient to suction the water 26 from each sampling inlet 110.

In other words, the suctioning of the water 26 by each sampling inlet 110 is only implemented when the flow rate in the supply pipe 20 is above a minimum dilution rate. In particular, the minimum dilution rate is greater than 110% of a minimum operating rate that the energy producing device 12 is configured to impose in the supply pipe 20.

Since the pump 14 is arranged downstream from the Venturi, during the suctioning of the water 26, the pressure difference between one of the suction inlets 52 and one of the sampling inlets 110 is also equal to the hydrostatic pressure difference between this suction inlet 52 and this sampling inlet 110. "Pressure at the suction inlet" for example refers to the pressure of the fuel taken at the center of the contour of the lateral opening 56 defining this suction inlet. "Pressure at the sampling inlet" for example refers to the pressure of the water taken at the center of the contour of the lateral opening 114 defining this sampling inlet.

Subsequently, the suctioned water 26 flows from the sampling inlet 110 toward the sampling outlet 112 to emerge in the transport pipe 44, then emerges in the supply pipe 20 through the discharge outlet 54 and flows with the fuel 24 toward the energy producing device 12 via the supply pipe 20.

The minimum dilution rate depends on the dimensions of the Venturi 62 and the dimensions of the supply pipe 46.

The water concentration in the fuel 24 flowing in the supply pipe 20 depends on the flow rate in the supply pipe 20.

Thus, fuel 24 having a controlled water concentration supplies the energy producing device 12, which makes it possible to purge the water 26 contained in the reservoir 16.

If the water 26 contained in the reservoir 16 freezes, for example due to temperature conditions during flight, the purging system 22 will then only suction fuel 24 and the energy producing device 12 will still be supplied. The described purging system 22 is thus robust with respect to freezing.

In a variant, the purging system 22 can also be used during a maintenance operation, to perform complete emptying of the reservoir 16 by gravitational flow. To that end, the valve 50 is kept and locked in its released configuration as previously described, until nothing else flows outside the reservoir 16. For example, the valve 50 is locked in this configuration for one to two hours.

Figure 7:
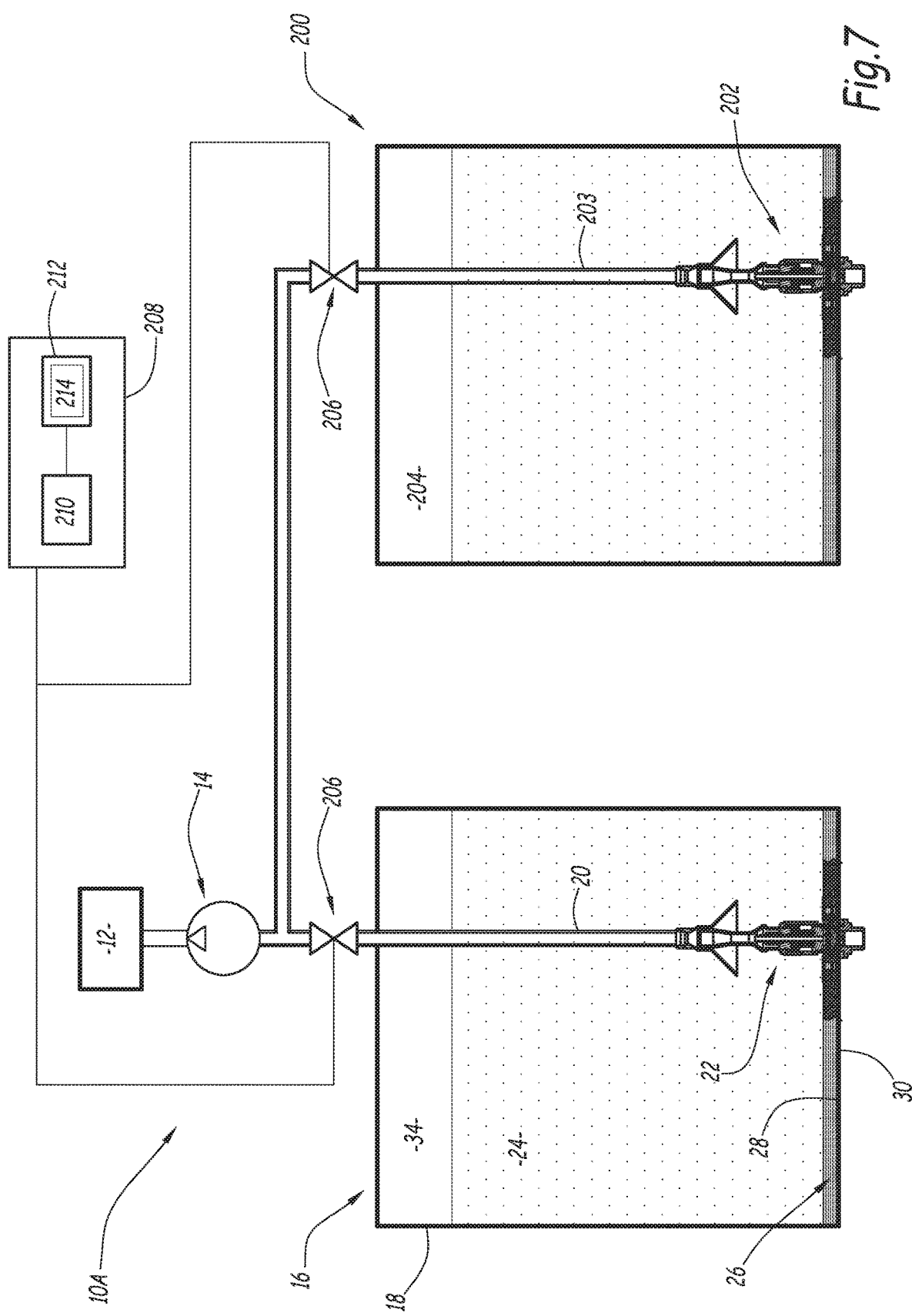
FIG. 7 is a schematic view of a variant of the first assembly.

In addition to the first assembly 10A, illustrated in FIG. 7, the first assembly 10A comprises at least an additional reservoir 200 and an additional purging system 202 for the water contained in the additional reservoir 200, which are similar to the reservoir 16 and the purging system 22 previously described.

The additional reservoir 200 also comprises an additional supply pipe 203, connected to the pump 14. The pump 14 is configured to circulate a fluid inside the additional supply pipe 203.

The additional supply pipe 203 is configured to supply said energy producing device 12 with the fuel 24 contained in the additional reservoir 200. To that end, the additional supply pipe 203 is fluidly connected to the energy producing device 12 and to the pump 14.

The additional supply pipe 203 here is connected to the supply pipe 20 of the reservoir 16, for example upstream from the pump 14.

Said reservoir 16 defines an inner volume 204 located outside the or each additional reservoir 200.

The first assembly 10A then further comprises a control valve 206 associated with each supply pipe 20, 203, each control valve 206 having an open configuration and a closed configuration of the supply pipe 20, 203 with which it is associated.

Each control valve 206 is thus associated with a reservoir 16, 200. In its closed configuration, each control valve 206 is configured to prevent the flow, toward the energy producing device 12, of the fuel 24 coming from the reservoir 16, 200 with which it is associated.

The first assembly 10A further comprises a processing unit 208.

The processing unit 208 comprises a processor 210 and a memory 212, the processor 210 being suitable for executing modules contained in the memory 212.

The memory 212 comprises a module 214 for managing the opening of the control valves 206.

The module 214 for managing the opening of the control valves 206 is configured to open, in a loop and successively, each control valve 206 during a predetermined time period.

The predetermined time period is, for information, greater than 30 seconds, preferably between 1 min and 3 min.

The module 214 for managing the opening of the control valves 206 is configured to allow the opening of only one of said control valves 206 per predetermined time period.

During operation, the purging method comprises, successively and in a loop, the purging by suctioning of the water 26 contained in each reservoir 16, 200 by the successive opening of each control valve 206 during a predetermined time period, only one of said control valves 206 being open per predetermined time period.

The purging method is implemented by the module 214 for managing the opening of the control valves 206.

In the exemplary embodiment of the invention above, the module 214 for managing the opening of the control valves 206 is made in the form of software stored in the memory 212. In a variant, the module 214 for managing the opening of the control valves 206 is at least partially made in the form of programmable logic components, or in the form of dedicated integrated circuits.

In a variant not illustrated in FIG. 7, the first assembly 10A comprises a plurality of other additional reservoirs and a control valve per additional reservoir similar to those described above.

In a variant, the transport pipe 44 has only one section inlet 52.

In a variant, the sealing gasket 90 of the valve 50 is secured to the outlet channel 70.

In a variant that is not shown, the sampling pipe 46 is formed in a separate part from the valve 50. The sampling pipe 46 thus remains stationary when the valve moves during the purging by gravitational flow.

In a variant of the first system, the purging system 22 has no sampling pipe 46. The first assembly 10A is then configured to perform only purging by gravitational flow, while having good compactness due to the fact that the supply pipe 20 and the transport pipe 44 are integral.

In a variant, the purging by gravitational flow is implemented by any other appropriate purging equipment.

Figure 8:
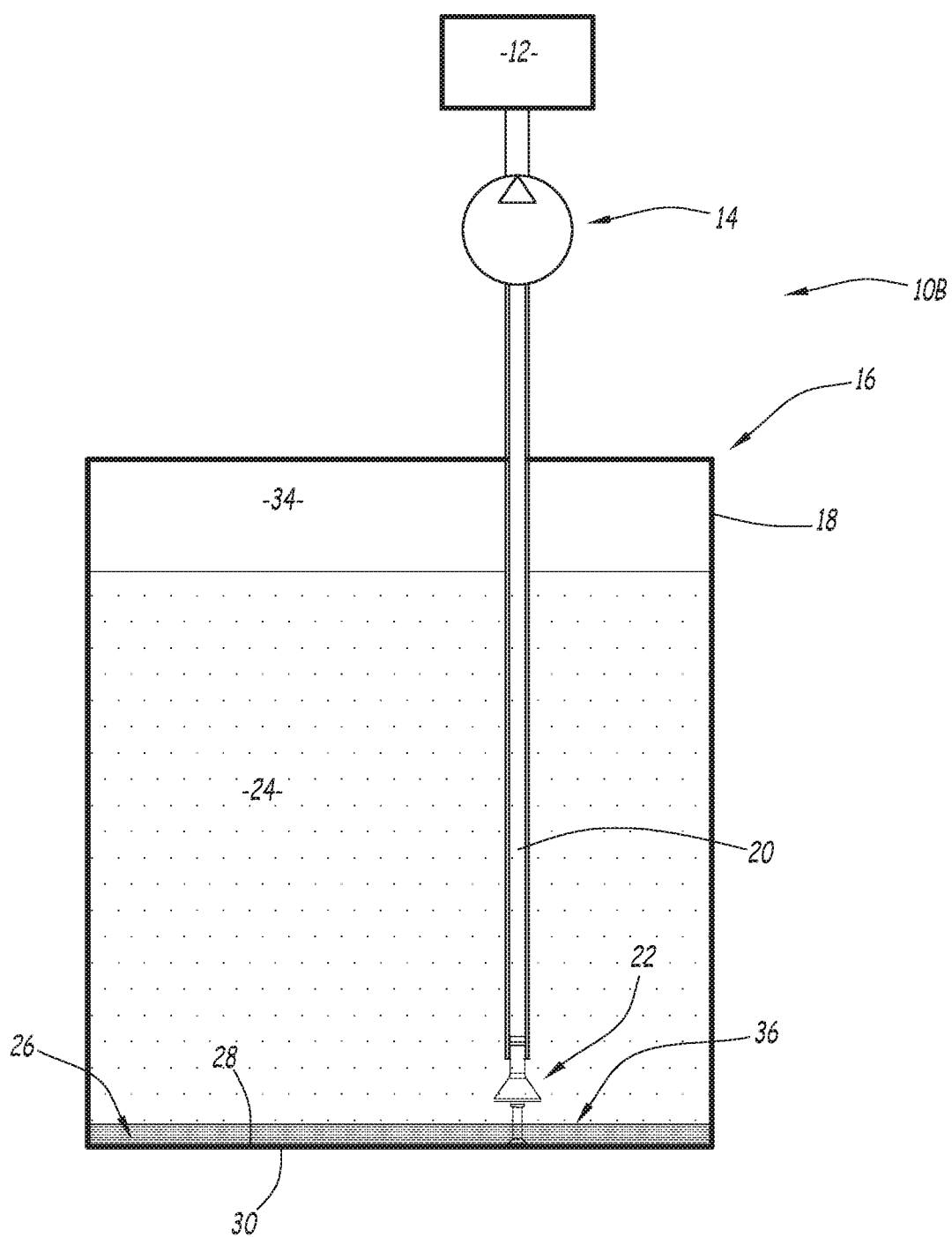
FIG. 8 is a view similar to FIG. 1 of a second aircraft energy producing assembly according to another embodiment of the invention.

A second assembly 10B will now be described, in reference to FIGS. 8 and 9.

This second assembly 10B differs from the first in that the sampling pipe 46 is not provided by a valve, but is secured to the transport pipe 44. As illustrated in FIG. 9, the purging system 22 of the second assembly 10B is in particular provided without the body 48 and the valve that are previously described. The sampling pipe 46 is mounted stationary relative to the transport pipe 44.

The transport pipe 44 comprises a maintaining neck 250 of the sampling pipe 46, the maintaining neck 250 gripping the sampling pipe 46.

The maintaining neck 250 has a length, considered along the longitudinal axis A, for example greater than 10 mm.

Unlike the first assembly 10A, the suction inlets 52 are not defined by lateral openings in the transport pipe 44.

The transport pipe 44 thus extends up to a lower open end 252, each suction inlet 52 being defined at this lower open end 252.

More specifically, the transport pipe 44 comprises a suction cone 254 upstream from the Venturi 62, each suction inlet 52 of the transport pipe 44 being delimited between the maintaining neck 250 and the suction cone 254.

Figure 9:
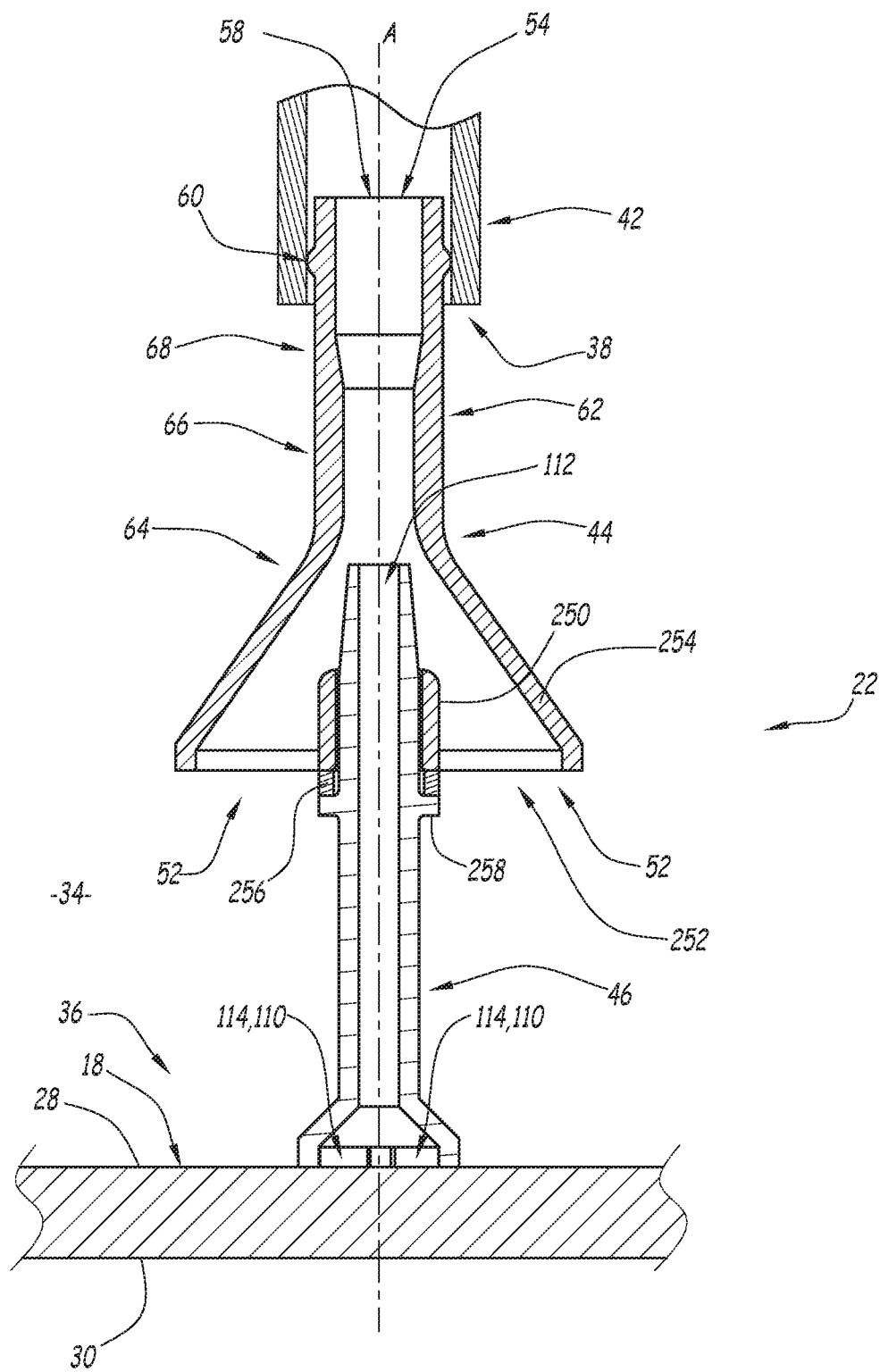
FIG. 9 is a schematic sectional view of the purging system of the second assembly of FIG. 8.

In the example illustrated in FIG. 9, the suction cone 254 extends from the region of constant inner section 66 of the Venturi 62, up to the free end of the transport pipe 44. Thus, this suction cone 254 defines the region of decreasing inner section 64 of the Venturi 62.

The maintaining neck 250 is in particular received in the suction cone 254 and is connected to the suction cone 254 by rods.

The rods are straight and extend perpendicular to the longitudinal axis A between the maintaining neck 250 and the suction cone 254.

Preferably, the maintaining neck 250, the rods and the suction cone 254 are integral.

Each suction inlet 52 is defined between the rods connecting the maintaining neck 250 to the suction cone 254.

Unlike the first assembly 10A, the sampling pipe 46 extends until it is in contact with the inner surface 28 of the wall 18 of the reservoir 16, in the region 36 of the reservoir 16 configured to accumulate the water 26 flowing by gravity after its condensation.

The wall 18 of the reservoir 16 has no through opening 32 facing the sampling pipe 46, i.e., at the intersection of the longitudinal axis A and the wall 18.

Like in the first assembly 10A, each sampling inlet 110 is still defined by a lateral opening 114, the lateral opening 114 having, in the second assembly 10B, an open contour as illustrated in FIG. 9.

During operation, like before, the pressure difference between one of the suction inlets 52 and one of the sampling inlets 110 is also equal to the hydrostatic pressure difference between this suction inlet 52 and this sampling inlet 110. Unlike what was previously described, "pressure at the suction inlet" here for example refers to the pressure of the fuel taken at the free end of the transport pipe 44. "Pressure at the sampling inlet" for example refers to the pressure of the water taken at the center of the open contour of the lateral opening 114 defining this sampling inlet.

The second assembly 10B also comprises a positioning shim 256 for the sampling pipe 46.

The positioning shim 256 allows the adjustment of the position, along the longitudinal axis A, of the sampling pipe 46 relative to the transport pipe 44.

The positioning shim 256 grips the sampling pipe 46. It has an inner section substantially complementary to an outer section of the sampling pipe 46.

The length of the positioning shim 256, taken along the longitudinal axis A, is for example greater than 2.5 mm.

The length of the positioning shim 256 makes it possible to choose the position of the sampling outlet 112 precisely in the transport pipe 44, and therefore to define the minimum passage section of the fuel between the inner part of the transport pipe 44 and the outer surface of the sampling pipe 46.

The sampling pipe 46 comprises a positioning protrusion 258, the positioning shim 256 being inserted between the positioning protrusion 258 and the maintaining neck 250 and being in contact with the positioning protrusion 258 and the maintaining neck 250.

The positioning protrusion 258 in particular extends laterally from the outer section of the sampling pipe 46.

In the second assembly 10B, the supply pipe 20 is directly connected to the energy producing device 12 without intermediate reservoir between the two.

Furthermore, the assembly has no other pump connected to the supply pipe 20.

In particular, the region located upstream from the Venturi 62 and the sampling pipe 46 have no pump.

In the second assembly 10B, the purging system 22 is thus only configured to perform purging by suctioning water 26 contained in the reservoir 16. It is not able to carry out purging by gravitational flow of the water 26 contained in the reservoir 16.

When the energy producing device 12 of the first assembly 10A or the second assembly 10B is an auxiliary power unit, during normal operation, the flow rate in the supply pipe 20 is then preferably less than 2 L/min.

Typically, aircraft engines and the auxiliary power units in use are certified to authorize a maximum water concentration in the fuel of 0.02% (200 ppm). For operation at higher concentrations, the capacity of the engine or the auxiliary power unit must be demonstrated. For example, for an aircraft whose auxiliary power unit can only be activated on the ground, the justification with respect to certification regulations are simpler, and the criticality related to a failure of the auxiliary power unit is not as high.

Furthermore, the auxiliary power unit is configured to operate even when the aircraft engines are off. The purge can therefore be implemented both on the ground and in flight, and in particular when the aircraft is stopped.

The purging system 22 and the energy producing device 12 are then configured in particular so that, for at least a flow rate in the supply pipe 20, the water concentration of the fuel 24 flowing in the supply pipe 20 is greater than 1%, preferably greater than 1.5%.

Advantageously, the minimum dilution rate is greater than 0.7 L/min, for example equal to 1 L/min.

In an addition not illustrated of the second assembly 10B, like for the addition previously described of the first assembly 10A illustrated in FIG. 7, the second assembly 10B similarly comprises at least an additional reservoir 200, an additional purging system for the water contained in the additional reservoir 200, a control valve 206 associated with each supply pipe 20 and a processing unit 208.

At least one region of the transport pipe 44 comprising the discharge outlet 54 is coaxial with a region of the supply pipe 20 comprising the open end 38 and the accommodating region 42 of the supply pipe 20.

What is claimed is:

1. A system for purging water contained in an aircraft fuel reservoir comprising:
 a body configured to be mounted on the aircraft fuel reservoir, at least partially through a through opening of a wall of the aircraft fuel reservoir, the body defining an outlet channel; and
 a valve, received in the body, and having a released configuration of the outlet channel, in which the outlet channel is configured to be in fluid communication with an inside of the aircraft fuel reservoir when the body is mounted on the aircraft fuel reservoir, and a tight closing configuration of the outlet channel, in which the outlet channel is configured to be fluidly isolated from the inside of the aircraft fuel reservoir when the body is mounted on the aircraft fuel reservoir; and a transport pipe secured to the body, the transport pipe being configured to be fluidly connected to a fuel supply pipe configured to supply an energy producing device with fuel contained in the aircraft fuel reservoir, the transport pipe extending at least between a fuel suction inlet and a discharge outlet, the fuel suction inlet being configured to emerge in the aircraft fuel reservoir and the discharge outlet being configured to emerge in the fuel supply pipe when the body is mounted on the aircraft fuel reservoir.

2. The system according to claim 1, wherein the valve is movable relative to the body and the body defines a valve seat, the valve being in contact with the valve seat in the tight closing configuration, and being separated from the valve seat in the released configuration.

3. The system according to claim 2, further comprising a return device for returning the valve to the tight closed configuration.

4. The system according to claim 3, wherein the return device comprises a spring having an end fastened to the body and an end fastened to the valve.

5. The system according to claim 1, wherein the transport pipe comprises a Venturi, between the fuel suction inlet and the discharge outlet.

6. The system according to claim 5, further comprising a sampling pipe mounted at least partially in the body and extending between a sampling inlet and a sampling outlet, the sampling inlet being configured to emerge at least partially opposite an edge of the through opening when the body is mounted on the aircraft fuel reservoir, the sampling outlet emerging in the transport pipe, upstream or in the Venturi.

7. The system according to claim 6, wherein the sampling pipe is formed by the valve, the sampling pipe being partially received in the body.

8. A set for purging the aircraft fuel reservoir comprising:
the purging system according to claim 1; and
a tool for locking and unlocking the valve in the released configuration, the tool comprising:
  a discharge pipe configured to be fastened removably on the body of the purging system, an inside of the discharge pipe and the outlet channel being in fluid communication when the discharge pipe is fastened on the body; and
  a rod secured to the discharge pipe and protruding relative to the discharge pipe, an outer end of the rod being configured to come into contact with the valve and to keep the valve in the released configuration when the discharge pipe is fastened on the body.

9. The set according to claim 8, wherein the valve has an outer face received in the outlet channel when the valve is in the tight closing configuration, the outer face having a spherical cavity, the outer end of the rod having a shape complementary to the spherical cavity.

10. The set according to claim 8, wherein the discharge pipe and the outlet channel each comprise a thread, the thread of the discharge pipe and the thread of the outlet channel being configured to cooperate to ensure the removable fastening of the discharge pipe on the body.

11. An energy producing assembly comprising:
the energy producing device of an aircraft;
the aircraft fuel reservoir containing fuel and water and comprising the wall defining the through opening and the fuel supply pipe configured to supply the energy producing device with fuel contained in the aircraft fuel reservoir;
the purging system according to claim 1, the body being mounted on the aircraft fuel reservoir at least partially through the through opening, the transport pipe being fluidly connected to the fuel supply pipe, the fuel suction inlet emerging in the aircraft fuel reservoir and the discharge outlet emerging in the fuel supply pipe.

12. The assembly according to claim 11, wherein the body has at least one lateral orifice, the lateral orifice being arranged inside the aircraft fuel reservoir and at least partially opposite an edge of the through opening, the outlet channel being in fluid communication with the inside of the aircraft fuel reservoir by the lateral orifice in the released configuration of the valve.

13. The assembly according to claim 11, wherein the fuel supply pipe has a guide cone of the purging system, receiving the transport pipe.

14. A method for purging water contained in the aircraft fuel reservoir comprising:
providing the assembly according to claim 11;
purging the water contained in the aircraft fuel reservoir by gravitational flow, the purging of the water contained in the aircraft fuel reservoir by gravitational flow comprising:
  passing the valve from the tight closing configuration to the released configuration; and
  flowing at least part of the water contained in the aircraft fuel reservoir toward the outlet channel.

15. The method according to claim 14, wherein the transport pipe comprises a Venturi between the fuel suction inlet and the discharge outlet, the purging system further comprising a sampling pipe mounted at least partially in the body and extending between a sampling inlet and a sampling outlet, the sampling inlet emerging at least partially opposite an edge of the through opening, the sampling outlet emerging in the transport pipe, upstream or in the Venturi;
the method further comprising purging the water contained in the aircraft fuel reservoir by suction, the purging of the water contained in the aircraft fuel reservoir by suction comprising:
  suctioning fuel through the fuel suction inlet of the transport pipe and flowing the suctioned fuel toward the energy producing device by the fuel supply pipe; and
  joint suctioning the water through the sampling inlet of the sampling pipe and flowing the suctioned water toward the energy producing device by the fuel supply pipe.

16. The method according to claim 14, wherein the purging of the water contained in the aircraft fuel reservoir by gravitational flow comprises providing a tool for locking and unlocking the valve in the released configuration, the tool comprising:
a discharge pipe configured to be fastened removably on the body of the purging system, an inside of the discharge pipe and the outlet channel being in fluid communication when the discharge pipe is fastened on the body; and
a rod secured to the discharge pipe and protruding relative to the discharge pipe, an outer end of the rod being configured to come into contact with the valve and to keep the valve in the released configuration when the discharge pipe is fastened on the body;
the passing of the valve from the tight closing configuration to the released configuration comprising:

placing the outer end of the rod in contact with the valve;

moving the tool so as to take the valve from the closing configuration to the released configuration;

fastening the discharge pipe on the body of the purging system; and flowing the water contained in the reservoir in the outlet channel and the discharge pipe.

17. A method for assembling the purging system on the aircraft fuel reservoir comprising:

providing the aircraft fuel reservoir comprising the wall defining the through opening and the fuel supply pipe configured to supply the aircraft energy producing device;

providing the purging system according to claim 1, the purging system initially being arranged away from the aircraft fuel reservoir;

inserting the transport pipe in the through opening and connecting the transport pipe to the fuel supply pipe, the discharge outlet emerging in the fuel supply pipe and the fuel suction inlet emerging in the aircraft fuel reservoir; and assembling the body of the aircraft fuel reservoir at least partially through the through opening.

* * * * *